United States Patent [19]

Nishikawa

[11] Patent Number: 4,939,650
[45] Date of Patent: Jul. 3, 1990

[54] PATH CORRECTION METHOD FOR A SELF-CONTAINED UNMANNED VEHICLE

[75] Inventor: Yuji Nishikawa, Ise, Japan

[73] Assignee: Shinko Electric Co., Ltd., Tokyo, Japan

[21] Appl. No.: 206,371

[22] Filed: Jun. 14, 1988

[51] Int. Cl.[5] .......................... G06F 15/50; B62D 1/02
[52] U.S. Cl. ................................. 364/424.02; 180/167
[58] Field of Search .................... 364/424.02, 424.01, 364/443, 449, 559; 180/167-169

[56] References Cited

U.S. PATENT DOCUMENTS

| | | | |
|---|---|---|---|
| 4,700,302 | 10/1987 | Arakawa et al. | 364/424.02 |
| 4,751,658 | 6/1988 | Kadonoff et al. | 364/513 |
| 4,772,832 | 9/1988 | Okazaki et al. | 318/587 |
| 4,815,008 | 3/1989 | Kadonoff et al. | 364/513 |
| 4,821,192 | 4/1989 | Taivalkoski et al. | 364/424.02 |

Primary Examiner—Thomas G. Black
Attorney, Agent, or Firm—Wenderoth, Lind & Ponack

[57] ABSTRACT

A method for controlling a robotic vehicle as the robotic is traversed from an origination node to a destination node is disclosed. An optimal nodal path is determined from the origination node to the destination node. A deviation distance is calculated from the actual location of the robotic vehicle to the optimal nodal path. This deviation distance is compared with the specified distance. If the deviation distance exceeds the specified distance, a determination is made as to whether correction of the travel path of the robotic vehicle by a combination of curves method would result in the robotic vehicle returning to the optimal path beyond a node to be traversed next. Correction of the travel path is effected by the combination of curves method if correction by such a method would result in the robotic vehicle returning to the optimal nodal path prior to the node to be traversed next. On the other hand, correction of the travel path is effected by a sidestep movement method if correction of the travel path by the combination of curves method would result in the robotic vehicle returning to the optimal nodal path beyond the node to be traversed next.

4 Claims, 6 Drawing Sheets $L1 > L$     $L > L1$

PATH CORRECTION METHOD FOR A SELF-CONTAINED UNMANNED VEHICLE

1. FIELD OF THE INVENTION

The present invention relates to an unmanned vehicle which, upon specification of a target location (destination), will search for a travel path to the target location (destination) on the basis of previously provided geographic data and travel to the target location (destination) while identifying its own currently traversed path, and, more particularly, to a path correction method in which the travel path can be corrected, especially in the event that the self-contained unmanned vehicle deviates from the normal travel path.

2. DESCRIPTION OF THE PRIOR ART

In recent years, the significant advances in factory automation have prompted the development of a large variety of unmanned vehicles or robot cars capable of automatically conveying items or objects such as parts and components, within premises, such as factories and warehouse precincts. The development of such robot cars includes a category known as self-contained unmanned vehicles, which, by merely specifying a node or nodal point corresponding to the target location or destination node are capable of independently searching for the optimum travel path and of determining the nodes to be traversed to reach the destination node, thereby ensuring automatic travel motion to the destination node. In this context, the term "node" denotes any location or point in which a change in the unmanned vehicle's travel condition occurs, such as its travel speed and/or its direction of movement, as in stop locations, turn-off points, and operating/handling positions.

FIG. 6 is an arrangement plan showing the general configuration of this type of self-contained unmanned vehicle. In this figure, reference numerals 2L and 2R denote left and right drive wheels, respectively, 3L and 3R denote motors for driving the left and right drive wheels 2L and 2R, respectively, 4L and 4R denote pulse encoders for detecting the rotational speeds of the left and right wheels 2L and 3R, respectively, 5 denotes castor-type roller-wheels, 6L and 6R denotes ultrasound receiving units for sensing the distance from the unmanned vehicle to the left and right walls W, respectively, and 7 denote the control unit. The control unit 7 consists of a microprocessor memory which holds previously stored geographic data relating to the travel path. The geographic data relate to the co-ordinates of each node traversed by the unmanned vehicles in its approach towards the destination point and to the distances from the unmanned vehicle to the left and right sides with respect to a given pre-determined travel path passing through these nodes.

When the destination node is specified by the central station, a corresponding target node instruction is supplied through a communication unit, which is not shown in the figure, to the control unit 7, whereupon the control unit 7 will search for the optimum travel path on the basis of the geographic data and determine the node or nodes to be traversed by the unmanned vehicle during its approach to the given destination node. Motors 3L and 3R, respectively, are set in motion to ensure that the unmanned vehicle's travels along the pre-determined travel path linking, in consecutive sequence, the respective nodes. The control unit 7 will then measure the distance to the left and right side walls W on the basis of the signals supplies from the ultrasonic transmitter/receiver devices 6L and 6R, respectively. It will also measure, on the basis of the signals supplied from the pulse encoders 4L and 4R, respectively, the travel distance from the node traversed immediately prior thereto. On the basis of these measurements results, the control unit 7 will make a judgment as to whether or not the current travel path deviates from the pre-determined normal travel path obtained on the basis of the geographic data, and, in the event that it should deviate therefrom, the travel path will be corrected accordingly. By this means, it is assured that the unmanned vehicle 1 will always travel along the pre-determined normal travel path to reach the destination node by traversing, in consecutive sequence, all nodes located en route.

In this context, two different methods for correcting the travel path of the unmanned vehicle 1 are conceivable, one being a correction method using a side-step movement and the other one being a method based on a combination of curves. As shown in FIGS. 7a and 7b, these two types of path correction methods can be explained as follows, by using, as an example, the case in which the current travel path $l_1$ is offset to the left relative the pre-determined normal path $l_o$, with the amount of offset D being greater than a given value.

(1) Path Correction Method Using Side-Step Movement.

As shown in FIG. 7a, when the amount of off-set D is larger than a given value, the unmanned vehicle 1 is caused to stop momentarily. The attitude of the drive wheels 2L and 3R is then inverted by an angle of 90°, whereupon the unmanned vehicle 1 will move sideways to the right, thereby performing an action known as a side-step movement to advance as far as the pre-determined normal travel path $l_o$, where the unmanned vehicle 1 will again stop. Travel will then be resumed after the drive wheels 2L and 2R, respectively, have subsequently been re-aligned to the normal travel direction.

(2) Path Correction Method Using a Combination of Curves.

As shown in FIG. 7b, when the amount of off-set D is smaller than a given value, the forward path of the unmanned vehicle 1 will be modified only by a given angle in the right-hand direction by controlling the wheel speed difference between the drive wheels 2L and 2R, respectively, whereupon the unmanned vehicle 1 will traverse, in a rectilinear movement, a suitable distance such that the forward path of the unmanned vehicle 1 is re-directed to the left by a given angle, thereby re-establishing the pre-determined normal travel path $l_o$ by causing the unmanned vehicle 1 to traverse a given pattern of curvilinear motion while continuing to maintain its forward travel movement.

These two path correction methods described hereinabove have been found to have the following drawbacks.

(1) The path correction method using a side-step movement has the disadvantage of requiring a momentary stop of the unmanned vehicle 1 when the drive wheels 2L and 2R, respectively, are re-directed. Two stops will be required to complete a single path correction operation. Such repeated stopping and accelerating will result in a higher power consumption and cause a rapid depletion of a battery charge in the batteryoperated unmanned vehicle 1. The double stop also results in serious increase in travel time.

(2) The path correction method using a combination of curves implies that, as shown in FIG. 7b, the unmanned vehicle 1 will advance only by the distance L until the correction operation is completed. Let us assume, for example, that a node N is located forward of the position P in which the path correction operation is completed. It then follows that the unmanned vehicle 1 will not be able to traverse this node N. Let us assume, further, that, for example, the unmanned vehicle 1 is required to stop at the position of node N for load handling operations to be effected at this location, consisting, for example, of the off-loading of transported goods. It is clear that the unmanned vehicle 1 will not stop until it has reached a position beyond note N.

SUMMARY OF THE INVENTION

The object of the present invention is to provide a method for restoring an unmanned vehicle on its pre-determined normal travel path prior to reaching a normal node by minimizing the power consumption and travel time losses even when the unmanned vehicle has deviated from its pre-determined normal travel path.

For this purpose, the present invention uses a travel path correction method in which: at the moment in which the present travel path deviates by a given amount from the pre-determined normal travel path, the given distance required for correcting the path, through a combination of curves given from the current position, is compared with the remaining travel distance until the node reached next from the current position, in such a manner that, if the remaining distance is greater than the given required distance, the travel path will be corrected by a combination of a given pattern of curves on the assumption that the path correction procedure will be completed ahead of the node reached next.

Conversely, if the remaining distance is smaller than the given required distance, the travel path will be corrected by a side-step movement in which the attitude of the drive wheel is re-directed so as to provide for a movement towards the side, on the assumption that the path correction procedure will be completed ahead of the node reached next.

It is therefore possible to overcome the disadvantages associated with these two methods of correction by making a purposeful selection between the path correction method using a set pattern of curves and the path correction method based on a side-step movement, in accordance with the distance to the node to be reached next.

DETAILED DESCRIPTION OF PREFERRED EMBODIMENTS

Figure 1:
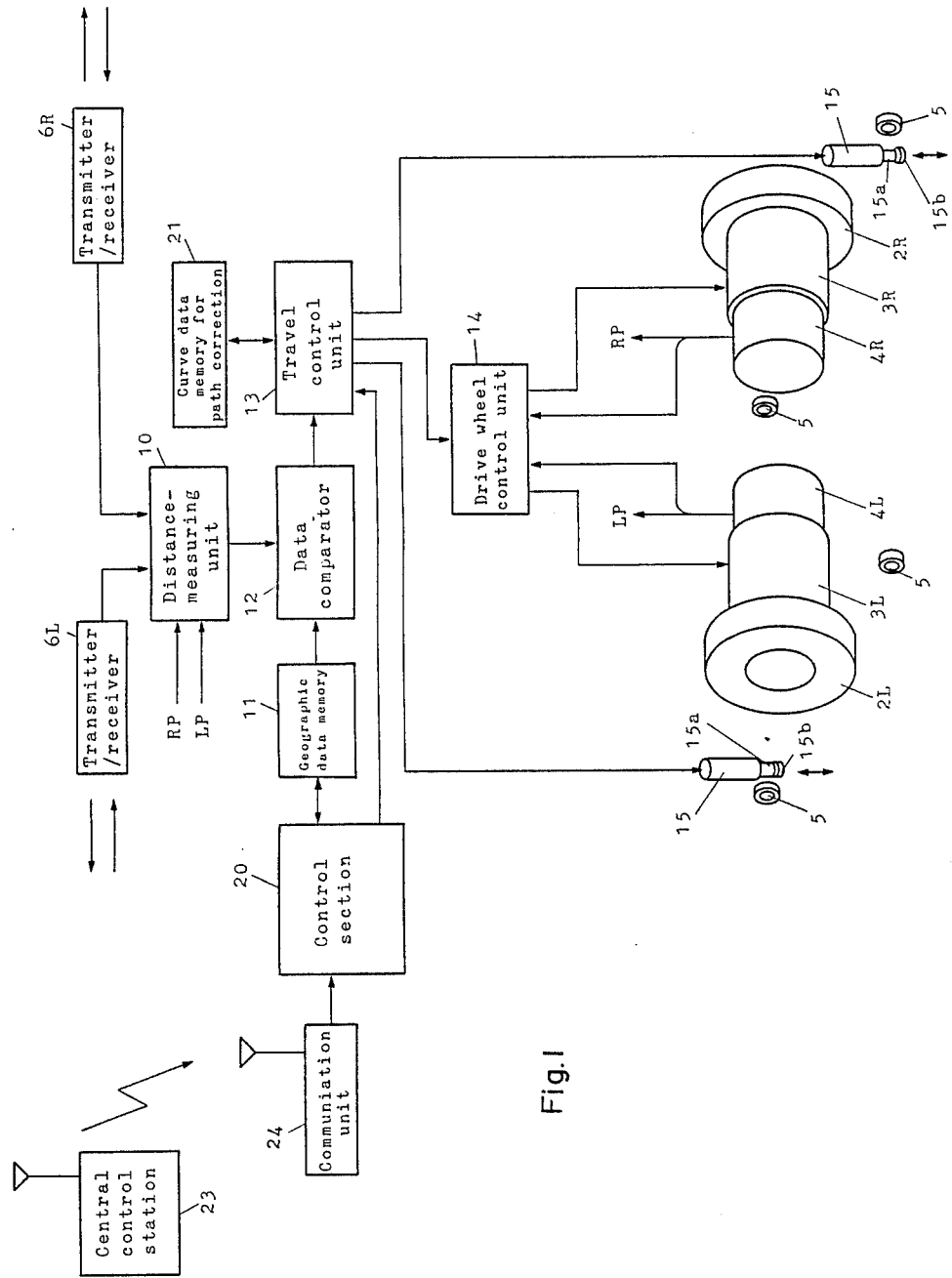
FIG. 1 is a block schematic showing the configuration of a self-contained unmanned vehicle in which the path correction method according to an embodiment of the present invention is applied.

FIG. 1 is a block schematic showing the configuration of a self-contained unmanned vehicle in which the path correction method according to a preferred embodiment of the present invention is applied.

Figure 2A:
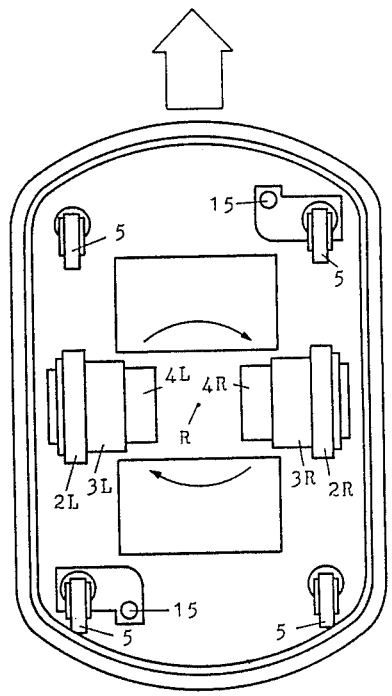
FIGS. 2a and 2b are floor plans showing the configuration of a self-contained unmanned vehicle according to the same embodiment.

In this figure, reference numeral 10 denotes a distance-measuring unit for determining the travel distance from the node traversed immediately beforehand by calculation on the basis of the pulse signals LP and RP supplied from the pulse encoders 4L and 4R. The distance measuring unit 10 also calculates the distance from the unmanned vehicle to the left and right side walls on the basis of the signals supplied from the ultrasound transmitter/receiver units 6L and 6R, respectively. Reference numeral 11 denotes a geographic data memory in which geographic data has been previously stored. Reference numeral 12 denotes a data comparator for comparing the distance-measurement data output from the distance-measuring element 10 with the geographic data output from the geographic data memory 11. Further, reference numeral 20 denotes a control section which operates in such a manner that when the destination node specified via wireless communication from the central control station 23 is supplied through the communication unit 24, it searches for the optimum path on the basis of the geographic data, and then determines the node or nodes to be traversed on the approach route to the destination node, and generates the necessary travel commands to ensure travel motion along the pre-determined path interlinking these nodes, and transmits these commands to the travel control section 13. The travel control section 13 generates the speed control signals for controlling the rotational speed of the left and right drive motors 2L and 2R, respectively, on the basis of the travel commands supplied from the control section 20, and supplies these speed control signals to the drive wheel control unit 14. Further, the travel control section 13 determines, on the basis of the comparison data supplied from the data comparator 12, whether or not the current travel path deviates, to an extent greater than a given amount d, from the pre-determined normal travel path obtained on the basis of the geographic data, and if it does, the corresponding speed control signals are supplied to the drive wheel control section 14, or, if necessary, the brake system is activated to correct the path by the procedure described hereinafter. The drive wheel control unit 14 controls the rotational speed of the motors 3L and 3R, respectively, on the basis of the speed control signals supplied from the travel control unit 13 and the speed feedback signals supplied from the pulse encoders 4L and 4R, respectively. The brake mechanism 15 consists of a braking cylinder, with one such brake mechanism being provided in the vicinity of each of two of the idler wheels 5 and, i.e., at the front and back of the unmanned vehicle and located to each other relative to diagonally the floor of the unmanned vehicle, as shown in FIG. 2. The rod 15a of the electric power cylinder projects in the downward direction so that the rubber element 15b mounted on the tip of this rod 15a strikes the bedplate on its descent, thereby actuating the brake. With the brake thus applied, the left and right wheels 2L and 2R are caused to rotate in the reverse sense so that said left and right drive wheels 2L and 2R will change their attitude from the normal direction shown in FIG. 2a to a direction obtained by turning the wheels through an angle of 90°, with point R as the center of rotation.

Furthermore, reference number 21 denotes memory having stored therein path correction curve data, which is data consulted by the travel control unit 13 when correcting the travel path by way of a combination of a given pattern of curves. The following types of curve data are stored in this memory. The first type of curve data are the control data used for altering the unmanned vehicle's travel direction only by a given angle in the right-hand direction so as to cause the unmanned vehicle to traverse a given pattern of curves. The second type of curve data are the control data for altering the unmanned vehicle's travel direction only by a given angle in the left-hand direction so as to cause the unmanned vehicle to a given pattern of curves.

Figure 3:
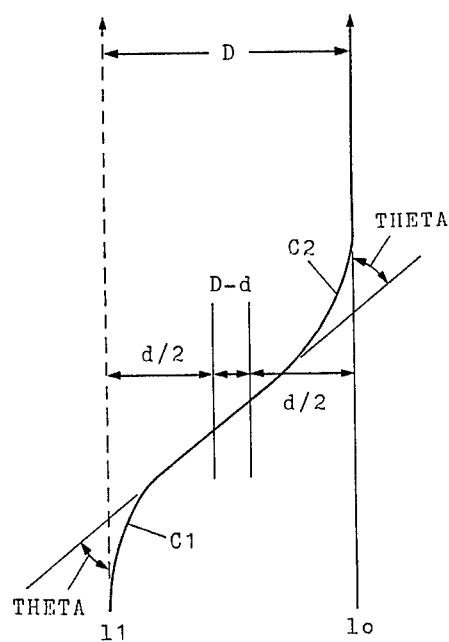
FIG. 3 is an illustration drawing showing, with respect to the same embodiment, the travel pattern of a self-contained unmanned vehicle whose path is corrected by means of a given pattern of curves.

The first curve data referred to above are essential control data required for controlling the unmanned vehicle in such a manner that while unmanned vehicle advances from the bottom of FIG. 3 to the top, it is made to traverse a curve C1, as shown in the same figure. As a result of its movement along curve C1, the direction of movement of the unmanned vehicle is caused to alter only by a given angle in the right-hand direction. During this operation, the unmanned vehicle moves only by half the given distance d (d/2) toward the right as shown in the figure.

On the other hand, the second curve data referred to above are essential control data required for controlling the unmanned vehicle in such a manner that it is made to traverse curve C2 oriented in a direction opposite to that of the first curve data. Consequently, as a result of its movement along curve C2, the direction of movement of the unmanned vehicle is caused to alter only by the given angle in the left-hand direction. During this operation, the unmanned vehicle moves only by half the distance d (d/2) towards the left in the figure.

Further, the travel control unit 13 is provided with a control function in which it can control the unmanned vehicle so as to maintain its present travel condition without changing its direction of forward movement and without changing its speed, that is, a control function causing the unmanned vehicle to travel at an uniform speed on a rectilinear path.

Furthermore, the travel control unit 13 is furnished with a decision-making function so that it can execute a selection between the correction mode in which the correction of the travel path of the unmanned vehicle is achieved by a combination of a given pattern of curves in accordance with the distance from the unmanned vehicle to the node to be reached next and the correction mode in which the correction of the travel path of the unmanned vehicle is achieved by means of a side-step movement. In other words, when the current travel position deviates from the pre-determined normal travel position to an extent in excess of a given amount d, the given distance L required for correcting the travel path from the present position by means of a combination of a given pattern of curves and the remaining travel distance L1 from the present position to the node to be traversed next are compared, and if the remaining distance L1 is greater than the given distance L, the travel path is corrected by the combination of curves of a given pattern, whereas, if the remaining distance L1 is smaller than the distance 11, the travel path is corrected by the side-step method in which the left and right drive wheels 2L and 2R are shifted sideways at an angle of 90°.

Figure 4:
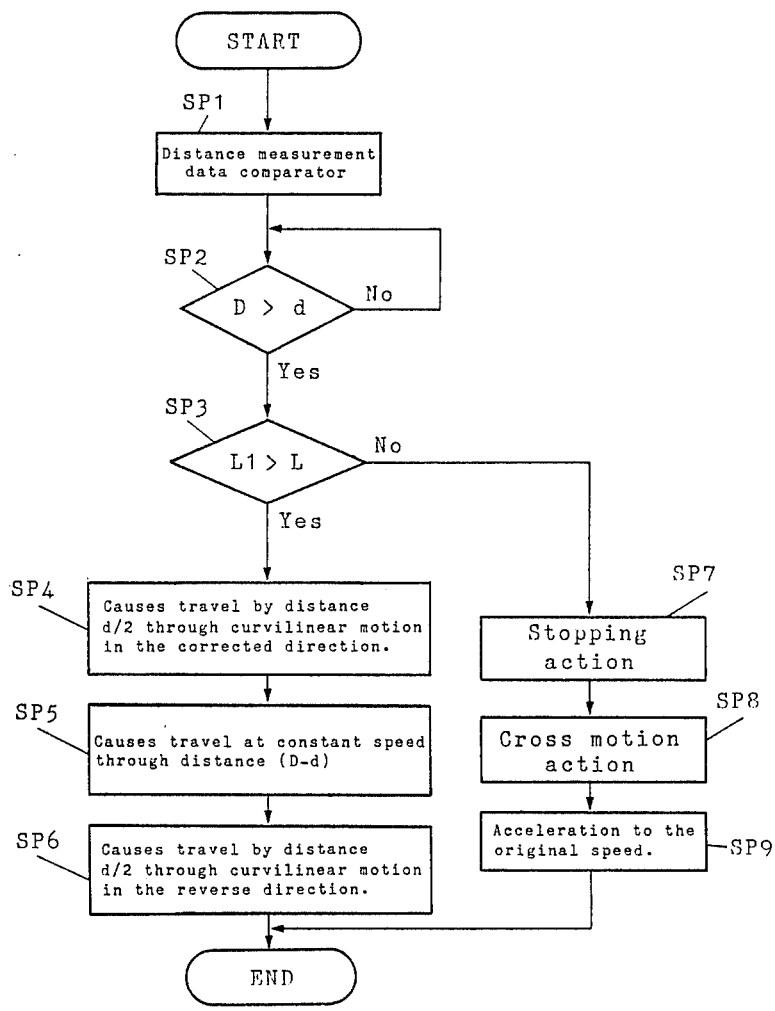
FIG. 4 is a flowchart to demonstrate the operation of the path correction method in the same embodiment.

The operation of the preferred embodiment referred to above can be explained as follows with reference to the flowchart presented in FIG. 4

In the same manner as applied in the previoiusly mentioned conventional types of unmanned vehicles, the unmanned vehicle according to the present invention compares, during its travel, the distance-measurement data and the geographic data (Step SP1), and determines the off-set amount D, being the difference between the distance-measurement data and said geographic data. Each time a given small time interval has elapsed, the amount of off-set D and the given value d are compared (Step SP2). If the given value d is equal to the sum obtained from the distance d/2, being the distance by which the unmanned vehicle advances in the right direction as shown in FIG. 3, curve C1 will be used, and, conversely, if the distance value is equal to the distance d/2, being the distance by which the unmanned vehicle advances in the left dirction as shown in FIG. 3, curve C2 is used.

No particular corrective control is exercised for as long as the amount of off-set does not exceed the given amount d, so that the travel control unit 13 allows the unmanned vehicle travel in a continuous travel motion.

Figures 5A, 5B:
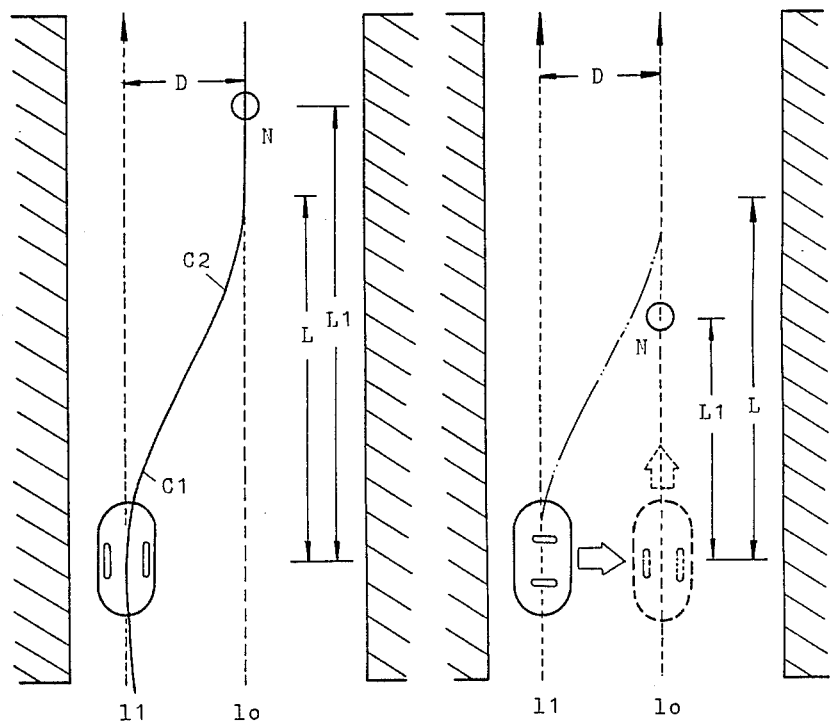
FIGS. 5a and 5b are plan views showing the operation of the path correction method with respect to the same embodiment.
Figure 6:
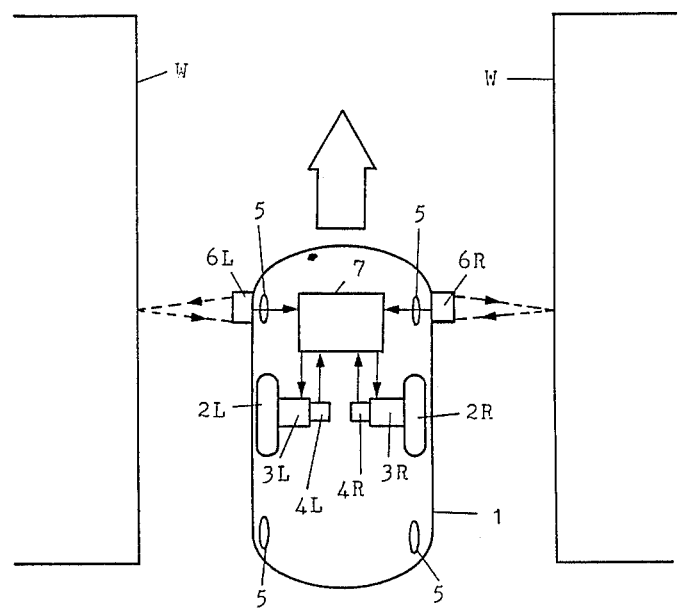
FIG. 6 is a plan view showing the general layout of a conventional self-contained unmanned vehicle.
Figure 7A:
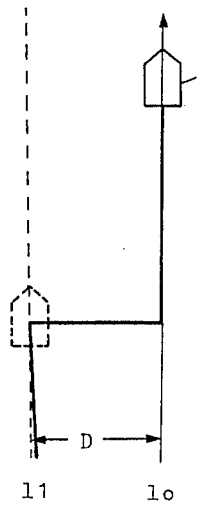
FIGS. 7a and 7b are illustrations showing the operation of a conventional path correction method.
Figure 7B:
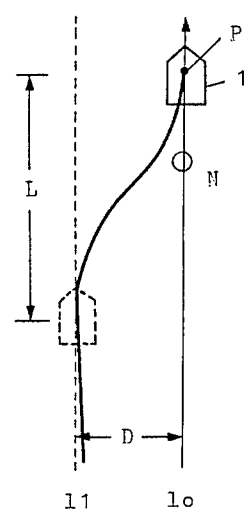

If, as shown in FIGS. 5a and 5b, by way of example, the unmanned vehicle now travels along a travel path that is significantly offset from the pre-determined normal path $1_o$ towards the left as shown in the figure, and if, therefore, the amount of offset is in excess of the given value d, then the next step SP3 will be engaged. In step SP3, the control section 13 compares the given distance L required for completing the correction of the travel path from the present position on the travel path 11 by means of a combination of curves of a given pattern and the remaining travel distance L1 from the present position to the node N to be traversed next.

In the case shown in FIG. 5a, in step SP3 a determination will be made that the remaining travel distance L1 is greater than the given distance L so that the path correction is considered as being completed ahead of the node N to be reached next and the procedure proceeds to step SP4. In the procedures given next for steps SP4→SP6, the travel path is corrected by a combination of curves of a given pattern.

This means that the travel control section 13 controls the travel path of the unmanned vehicle on the basis of the first curve data stored in memory 21, causing the unmanned vehicle to follow curve C1. In this case, the unmanned vehicle continues its travel motion, and the direction of this travel motion changes from the travel path $1_1$ towards the right only by the given angle $\theta$, advancing from the travel path $1_1$ towards the right only by the distance d/2 (step SP4). After the unmanned vehicle has completed its course on curve C1, step SP5 is initiated to cause the unmanned vehicle to travel at a uniform speed in rectilinear motion. As can be seen from FIG. 3, the travel distance in this case is equal to the distance resulting when the unmanned vehicle is displaced to the right by a distance (D-d) obtained by subtracting the given value d from the off-set amount D. When the unmanned vehicle is moved to the right only by the distance (D-d), step SP6 will be initiated whereby the travel control unit 13 will control the travel movement of the unmanned vehicle on the basis of the second curve stored in memory 21 and cause the unmanned vehicle to traverse curve C2.

Consequently, the unmanned vehicle continues its travel motion, and the direction of this travel motion changes towards the left only by the given angle $\theta$, advancing to the right only by the distance d/2. As a result, the unmanned vehicle will be restored to its pre-determined normal travel path $l_o$ prior to reaching node N to be reached next, whereupon it will travel along the pre-determined normal path $l_o$ on its approach towards node N.

Figure 2B:
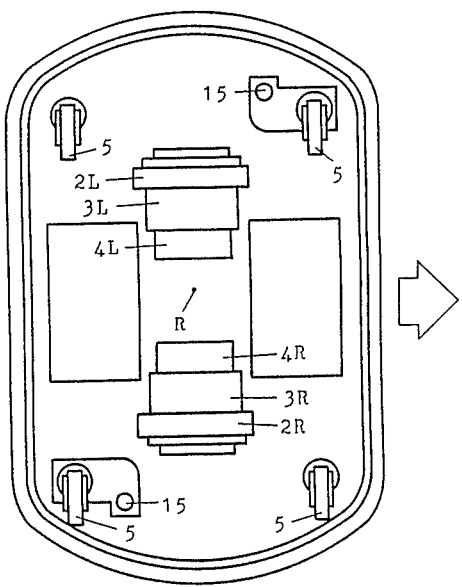

In the case shown in FIG. 5(b), however, the judgment is made in step SP3, that the remaining travel distance L1 is less than the given distance L so that the path correction is considered as not being completed ahead of node N to be reached next and the procedure proceeds to step SP7. In the procedure given next for steps SP7→SP9, the travel path is corrected by a side-step operation in which the orientation of the drive wheels is altered by shifting them sideways. In other words, the travel control section 13 causes the unmanned vehicle to stop momentarily (step SP7) and then it is displaced in the side-step operation of step SP8. In step SP8, the brake mechanism 15 is activated in that its rod 15a is extended down to prject from the bottom so that the rubber element mounted on the front end of the rod 15a strikes against the bedplate so as to apply the brakes on the unmanned vehicle. With the brakes applied in this manner, the left and right drive wheels 2L and 2R, respectively, are caused to rotate in mutually opposing directions so that the left and right drive wheels 2L and 2R, respectively, are brought from their normal attitude shown in FIG. 2a to an orientation turned at an offset angle of 90°, with point R as the center of rotation, as shown in FIG. 2b. The left and right drive wheels 2L and 2R are then caused to rotate in the same direction to move the unmanned vehicle back to the pre-determined normal path $l_o$, where the unmanned vehicle is stopped again. The drive wheels 2L nd 2R are then made to change back to their original normal travel orientation to complete the side-step operation. After this, the sequence goes over to step SP9 with a resumption of travel by acceleration to reach the given travel speed. As a result, the unmanned vehicle is restored to its pre-determined normal travel path $l_o$ at a location forward of node N. It will then travel along its normal travel path to approache node N.

If, contrary to the examples shown in FIGS. 5a and 5b, the unmanned vehicle deviates considerably to the left of the pre-determined normal path $l_o$, the unmanned vehicle will be restored to its pre-determined normal travel path in the same manner as the procedure described hereinabove, even if said amount of deviation exceeds the given value d.

Accordingly, a discrimination is made in the selection as to whether the correction method using a combination of curves of a given pattern should be used in accordance with the remaining travel distance until the next node is reached or, alternatively, whether the side-step method of correction should be employed to restore the unmanned vehicle to the pre-determined normal path $l_o$ ahead of node N.

As has been explained above, a differentiation is made, according to this invention, between the path correction method using a combination of curves and the side-step correction method, depending on the distance from the unmanned vehicle to the node to be reached next. Through this differentiated use of the two correction methods, the shortcomings associated with each method are overcome so. That is, power consumption and travel time loss can be reduced to the absolute minimum as compared with the conventional the side-step correction method, and, furthermore, the unmanned vehicle can be restored to its pre-determined normal path in such a manner as to ensure the correction always takes place ahead of the next node as compared to the combination of curves method.

What is claimed is:

1. A method for controlling a robotic vehicle as the robotic vehicle is traversed from an origination node to a destination node, said method comprising the steps of:
   (a) determining an optimal nodal path from the origination node to the destination node, the optimal nodal path being defined by a plurality of nodes, each of the plurality nodes representing a target location at which the robotic vehicle is to be traversed;
   (b) determining an actual location of the robotic vehicle as the robotic vehicle is traversed from node to node;
   (c) determining a deviation distance of the robotic vehicle, the deviation distance being a distance from the actual location of the robotic vehicle to the optimal nodal path;
   (d) comparing the deviation distance with a specified distance; and, when the deviation distance exceeds the specified distance,
   (e) determining whether correction of a travel path of the robotic vehicle by a combination of curves method would result in the robotic vehicle returning to the optimal nodal path beyond a node to be traversed next;
   (f) correcting the travel path of the robotic vehicle by a combination of curves method if correction of the travel path by the combination of curves method would result in the robotic vehicle returning to the optimal nodal path prior to a node to be traversed next;
   (g) correcting the travel path of the robotic vehicle by a side-step movement method if correction of the travel path by the combination of curves method would result in the robotic vehicle returning to the optimal nodal path beyond the node to be traversed next;
   wherein the combination of curves method includes traversing the robotic vehicle in rectilinear and curvature motions to the optimal nodal path, and wherein the side-step movement method includes traversing the robotic vehicle directly to the optimal nodal path.

2. A method as recited in claim 1, wherein said step (e) comprises the step of:
   determining a first distance from a first point on the optimal nodal path at which the robotic vehicle deviates from the optimal nodal path to the node to be traversed next;
   determining a second distance from the first point on the optimal nodal path at which the robotic vehicle deviates from the optimal nodal path to a second point on the optimal nodal path at which the robotic vehicle would return to the optimal nodal path if the combination of curves method was used to correct the travel path;
   comparing the first and second distances;
   wherein step (f) is effected if the first distance is greater than the second distance, and wherein step (g) is effected if the second distance is greater than the first distance.

3. A method for controlling a robotic vehicle as the robotic vehicle is traversed from an origination node to a destination node, said method comprising the steps of:

(a) determining an optimal nodal path from the origination node to the destination node, the optimal nodal path being defined by a plurality of nodes, each of the plurality of nodes representing a target location at which the robotic vehicle is to be traversed;

(b) determining an actual location of the robotic vehicle as the robotic vehicle is traversed from node to node;

(c) determining a deviation distance of the robotic vehicle, the deviation distance being a distance from the actual location of the robotic vehicle to the optimal nodal path;

(d) comparing the deviation distance with a specified distance; and, when the deviation distance exceeds the specified distance, (e) determining whether correction of a travel path of the robotic vehicle by a combination of curves method would result in the robotic vehicle returning to the optimal nodal path beyond a node to be traversed next;

(f) correcting the travel path of the robotic vehicle by a combination of curves method if correction of the travel path by the combination of curves method would result in the robotic vehicle returning to the optimal nodal path prior to a node to be traversed next;

(g) correcting the travel path of the robotic vehicle by a side-step movement method of correction if the travel path by the combination of curves method would result in the robotic vehicle returning to the optimal nodal path beyond the node to be traversed next;

wherein the combination of curves method includes traversing the robotic vehicle along a first curve in a first curvature direction until one half of the specified distance extending from the optimal nodal path is traversed, and traversing the robotic along a second curve in a second curvature direction opposite the first curvature direction from a point at which the robotic vehicle deviates from the optimal nodal path by one half the specified distance to a point at which the robotic vehicle returns to the optimal nodal path, and wherein the side-step movement method includes stopping the robotic vehicle and then traversing the robotic vehicle directly to the optimal nodal path.

4. A method as recited in claim 3, wherein said step (e) comprises the steps of:

determining a first distance from a first point on the optimal nodal path at which the robotic vehicle deviates from the optimal nodal path to the node to be traversed next;

determining a second distance from the first point on the optimal nodal path at which the robotic vehicle deviates from the optimal nodal path to a second point on the optimal nodal path at which the robotic vehicle would return to the optimal nodal path if the combination of curves method was used to correct the travel path;

comparing the first and second distances, where step (f) is effected if the first distance is greater than the second distance, and wherein step (g) is effected if the second distance is greater than the first distance.

* * * * *